United States Patent [19]

Ishikawa

[11] Patent Number: 5,777,785
[45] Date of Patent: Jul. 7, 1998

[54] BINOCULARS

[75] Inventor: Yasuaki Ishikawa, Sagamihara, Japan

[73] Assignee: Nikon Corporation, Tokyo, Japan

[21] Appl. No.: 588,510

[22] Filed: Jan. 18, 1996

[30] Foreign Application Priority Data

May 30, 1995 [JP] Japan ................... 7-131263

[51] Int. Cl.$^6$ ................... G02B 23/00; G02B 27/02; G02B 5/04

[52] U.S. Cl. ................... 359/425; 359/407; 359/480; 359/831

[58] Field of Search ................... 359/375–380, 359/404–416, 425–429, 480–482, 694, 698, 703–706, 831–837

[56] References Cited

U.S. PATENT DOCUMENTS

| Re. 30,665 | 7/1981 | Altenheiner et al. | 359/416 |
|---|---|---|---|
| 4,727,859 | 3/1988 | Lia | 359/831 |
| 4,806,007 | 2/1989 | Gradon | 359/429 |
| 5,235,458 | 8/1993 | Akagi et al. | 359/416 |

FOREIGN PATENT DOCUMENTS

| 2305887 | 8/1974 | Germany | 359/831 |
|---|---|---|---|
| 2501178 | 7/1976 | Germany | 359/831 |
| 54-140554 | 10/1979 | Japan . | |
| 57-164205 | 10/1982 | Japan | 359/831 |
| 59-53521 | 12/1984 | Japan . | |

OTHER PUBLICATIONS

Nikon Corporation, Nikon Binoculars General Catalogue, Jul. 1, 1994, p. 12.

*Primary Examiner*—Thong Nguyen

[57] ABSTRACT

Binoculars provided with first and second objective lens barrels respectively having objective lenses at an end, first and second eyepiece lens barrels respectively having eyepiece lenses and adapted to slide respectively on the other end portions of the first and second objective lens barrels, prisms positioned between the objective lenses and the eyepiece lenses and provided respectively in the first and second objective lens barrels, and a focusing mechanism provided with a focusing member and adapted to displace the first and second eyepiece lens barrels in the axial direction by the rotation of the focusing member, wherein each of the prisms is composed of a roof prism having an entrance face for receiving the light beam from the objective lens and an exit face for introducing the received light beam to the eyepiece lens, the exit face being so formed as to be loosely insertable in the eyepiece lens barrel and the periphery of the entrance face being fixed in the objective lens barrel so as that the exit face can enter the eyepiece lens barrel when the eyepiece lens barrel is auxiliary displaced toward the roof prism by the focusing mechanism.

5 Claims, 6 Drawing Sheets

BINOCULARS

BACKGROUND OF THE INVENTION

1. Field of the Invention

The present invention relates to binoculars effecting focusing operation by a movement of the eyepiece lenses in the axial direction.

2. Related Background Art

There are conventionally known binoculars provided with a pair of objective lens barrels respectively having objective lenses, a pair of eyepiece lens barrels respectively having eyepiece lenses, prisms positioned between the objective lenses and the eyepiece lenses, and a focusing mechanism including a focusing member and adapted to move the paired eyepiece lens barrels in the axial direction of the eyepiece lenses by the rotation of the focusing member.

In such binoculars, for securing a wide focusing range of the focusing mechanism, the external peripheries of the eyepiece lens barrels are so constructed as to slide, over a wide range, on the internal peripheries of the objective lens barrels.

Consequently, in case roof prisms are employed as the prisms of such binoculars, such roof prisms are positioned distant from the eyepiece lenses, in order that the exit faces of the roof prisms do not interfere with the movement of the eyepiece lens barrels.

Such roof prisms are supported by prism holders, which are provided with fixing portions for fixing in the objective lens barrels and are adapted to support the roof prisms in such a manner that the exit faces of the roof prisms are positioned in such fixing portions.

The prism is aligned with a prism box by strongly pressing a lateral face of the prism with a screw, set in an adjusting hole provided in a lateral face of the prism holder. Consequently the prism box is formed by die casting, in order to prevent deformation in the alignment with the prism.

The prism box, after completing such prism alignment, is fixed by the fixing portion (at the exit face side of the prism), in the objective lens barrel.

In such conventional technology, as explained in the foregoing, the exit faces of the roof prisms have to be positioned outside of the axial movement range (in the direction toward the objective lenses) of the eyepiece lens barrels, in order to secure a wide focusing range in the focusing mechanism.

Also in the conventional technology, in the mounting of the roof prism in the prism holder, the exit face side of the roof prism is fixed in the objective lens barrel.

If the exit face side of the roof prism is fixed in such manner, the entrance face of the roof prism becomes positioned close to the objective lens.

Thus, as the entrance face of the roof prism comes closer to the objective lens, there has to be secured a larger amount of incident light to the roof prism, so that the entrance face of the roof prism has to be made larger. With such a roof prism with a larger entrance face, the objective lens barrels have to be made larger, so that the binoculars become bulkier. Also, such larger roof prisms increase the weight of the binoculars.

For overcoming the above-mentioned drawbacks, the entrance faces of the roof prism can be made smaller by extending the length of the binoculars in the axial direction, but such method increases the length of the binoculars themselves and is therefore practically inconvenient.

Also as the prism box is formed by die casting, the adjusting hole used in the alignment of the roof prism and the prism box, the mounting portion of the prism box for mounting to the objective lens barrel and the fixing holes in the mounting portion have to be prepared precisely after the formation by die casting. Also the prism box has to be washed after such preparing operations.

Furthermore, as the prism boxes are formed by the casting, they inevitably become heavy to increase the weight of the entire binoculars. In order to overcome this drawback, it is conceivable to reduce the thickness of the prism box, but such prism box with reduced wall thickness may be deformed at the alignment with the screw.

SUMMARY OF THE INVENTION

In consideration of the foregoing, the object of the present invention is to provide binoculars which are light in weight and compact.

The above-mentioned object can be attained, according to an embodiment of the present invention, by binoculars provided with first and second objective lens barrels (34, 9) respectively provided, at an end thereof, with objective lenses (35, 36); first and second eyepiece lens barrels (23, 45) provided with eyepiece lenses (17, 18, 19) and respectively provided slidably at the other ends of said first and second objective lens barrels (34, 9); prisms positioned between said objective lenses and said eyepiece lenses and provided respectively in said first and second objective lens barrels; and a focusing mechanism (2) having a focusing member (30) and adapted to displace said first and second eyepiece lens barrels in the axial direction by the rotation of said focusing member (30), wherein said prisms (6) are composed of roof prisms having entrance faces (6a) for receiving the light beams from said objective lenses and exit faces (6b) for introducing said received light beams into said eyepiece lenses and are so constructed that the exit faces thereof are loosely insertable into the eyepiece lens barrels (23, 45) and that the peripheries of said entrance faces are fixed in said objective lens barrels in such a manner that said exit faces (6b) enter said eyepiece lens barrels when said eyepiece lens barrels are displaced toward said roof prisms along the axial direction.

The above-mentioned embodiment can secure a wide focusing range as the exit face sides of the prisms can enter the eyepiece lens barrels.

In another embodiment of the binoculars of the present invention, each of the roof prisms (6) is supported in a prism box (5) which is provided with a prism support portion (50) having a support plane (51) on which the rim of the exit face (6b) is placed, an insertion aperture (58a) for inserting the roof prism (6) from the exit face (6b) thereof, a fixing portion (8) to be fixed in the objective lens barrel, and position adjusting portions (55, 56) provided between the prism supporting portion (50) and the fixing portion (8) and adapted to effect alignment of the support plane and the exit face.

In the above-mentioned embodiment, the entrance face of the prism is positioned at the side of the fixing portion, as the prism is inserted, from the exit face side thereof, into the prism holder.

In still another embodiment of the binoculars of the present invention, the above-mentioned prism box (5) is integrally formed with a plastic material.

This embodiment allows weight reduction as the prism box is formed with the plastic material.

DESCRIPTION OF THE PREFERRED EMBODIMENTS

Now the present invention will be clarified in detail by preferred embodiments of the binoculars, with reference to the attached drawings.

Figure 1:
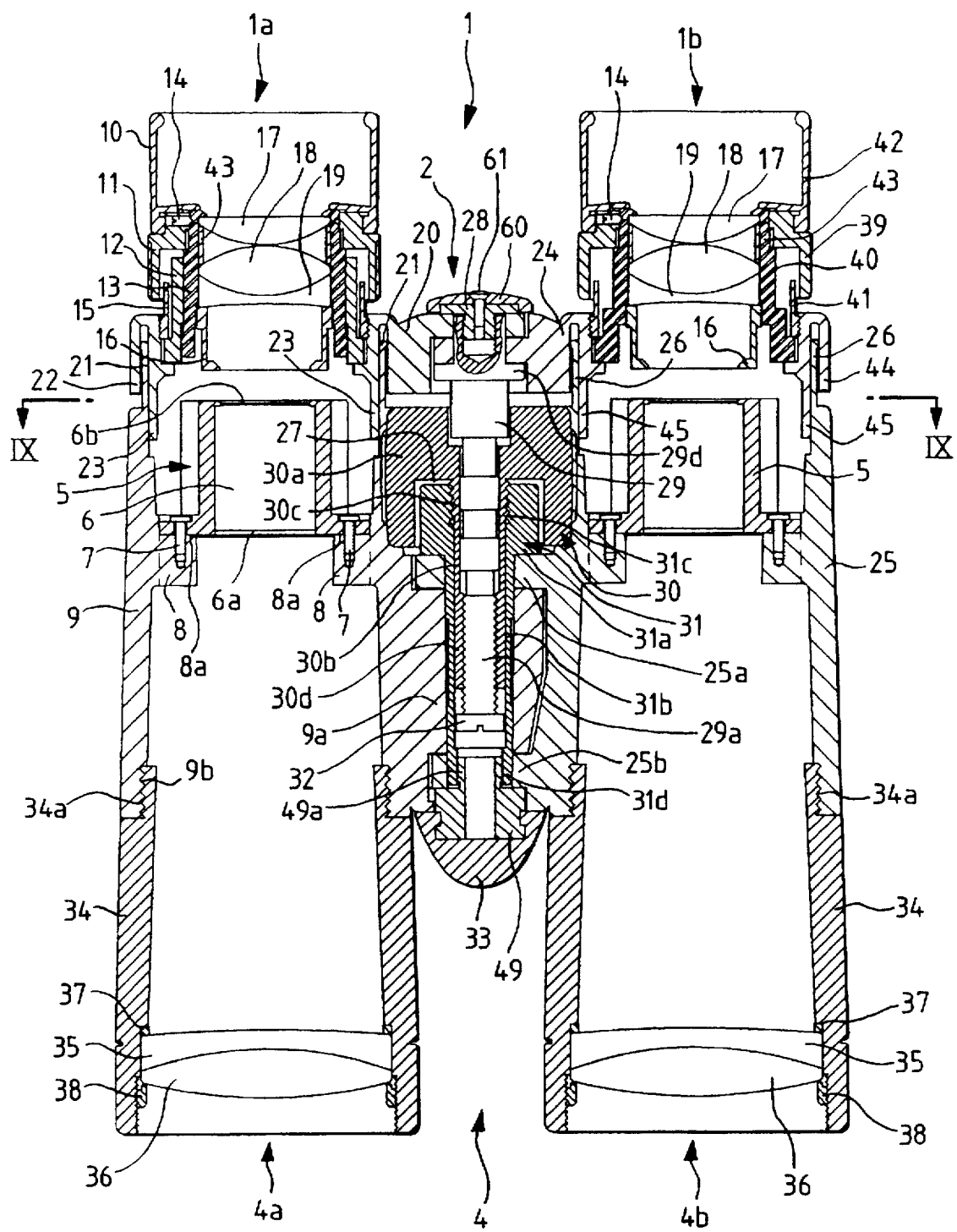
FIG. 1 is a cross-sectional view of entire binoculars.

FIG. 1 is a cross-sectional view of entire binoculars.

As shown in FIG. 1, the binoculars are composed of an eyepiece unit 1 having a right eyepiece portion 1a and a left eyepiece portion 1b, an objective unit 4 having a right objective portion 4a and a left objective portion 4b, and a focusing mechanism 2.

Usually the right and left eyes of the observer have different eyesights. For this reason, in order to balance the right and left eyesights of the observer in the use of the binoculars, there is provided a diopter movement mechanism. In the binoculars of the present embodiment, a diopter movement mechanism is provided in the right eyepiece portion 1a.

The right eyepiece portion 1a is constructed in the following manner.

The right eyepiece portion 1a is composed of a right eyepiece lens barrel 23, a support member 12 provided on the internal periphery thereof with a female screw, a lens chamber 13 having a lead screw on the external periphery at an end, a diopter ring 11, an eye cup 10, and eyepiece lenses 17, 18, 19.

The right eyepiece lens barrel 23 is provided with a right connecting portion 20 extending toward the left eyepiece portion 1b and covering an eyepiece side end portion 21 of a right lens barrel body 9, and a fitting portion 22 covering the eyepiece side end portion 21 of the right lens barrel body 9. The fitting portion 22 is constructed in an annular shape, integrally with the right connecting portion 20. Thus the eyepiece side end portion 21 of the right lens barrel body 9 is fitted between the right eyepiece lens barrel 23 and the right connecting portion 20, and between the right eyepiece lens barrel 23 and the fitting portion 22.

Inside the right eyepiece lens barrel 23, a support member 12 is mounted by a press ring 15.

The support member 12 and the lens chamber 13 are mounted by the engagement of the lead screw of the lens chamber 13 with the female screw of the support member 12.

On the external periphery at the other end of the lens chamber, a diopter ring 11 is fixed with a setting screw 14, and an eye cup 10 is mounted on the diopter ring 11. The diopter ring 11 serves to cover and protect the support member 12 and the press ring 15.

In the lens chamber 13, there are fixed, by means of a lens press ring 16, an eyepiece lens 17, an eyepiece lens 18 separated from the eyepiece lens 17 by a separating ring 43, and an eyepiece lens 19 adhered to the eyepiece lens 18.

When the diopter ring 11 is rotated about the optical axis of the lenses 17, 18, 19, these eyepiece lens 17, 18, 19 move in the axial direction together with the lens chamber 13 and the diopter ring 11 because of the engagement between the lead screw of the lens chamber 13 and the female screw of the support member 12, thereby adjusting the diopter.

As explained in the foregoing, the diopter movement mechanism is composed of the lens chamber 13, the support member 12 and the diopter ring 11.

The left eyepiece portion 1b is constructed in the following manner.

The left eyepiece portion 1b is composed of a left eyepiece lens barrel 45, a lens chamber 40, a cover 39, an eye cup 42, and eyepiece lenses 17, 18, 19.

The left eyepiece lens barrel 45 is provided with a left connecting portion 24 extending toward the right eyepiece portion 1a and covering an eyepiece side end portion 26 of a left lens barrel body 25, and a fitting portion 44 covering the eyepiece side end portion 26 of the left lens barrel body 25. The fitting portion 44 is formed in an annular shape, integrally with the left connecting portion 24. On the internal periphery of the left eyepiece lens barrel 45, an end of the lens chamber 40 is mounted by a press ring 41. Thus the eyepiece side end portion 26 of the left lens barrel body 25 is fitted between the left eyepiece lens barrel 45 and the left connecting portion 24, and between the left eyepiece lens barrel 45 and the fitting portion 44.

On the external periphery at the other end of the lens chamber, a cover 39 is fixed with a setting screw 14, and an eye cup 42 is mounted on the cover 39. The cover 39 serves to protect the press ring 41.

As in the lens chamber 13 of the right eyepiece portion 1a, there are fixed in the lens chamber 40, by means of a lens press ring 16, an eyepiece lens 17, an eyepiece lens 18 separated therefrom by a separating ring 43, and an eyepiece lens 19 adhered to the eyepiece lens 18.

The eyepiece unit 1 is constructed by the connection of the right connecting portion 20 of the right eyepiece portion 1a and the left connecting portion 24 of the left eyepiece portion 1b.

The right objective portion 4a is constructed in the following manner.

The right objective portion 4a is composed of a right objective lens barrel 34, objective lenses 35, 36 and a right lens barrel body 9.

In the right objective lens barrel 34, an f-adjusting washer 37 is mounted on the internal periphery at an end, and objective lenses 35, 36 are pressed thereto by a lens press ring 38. The f-adjusting washer 37, provided in each of the left and right objective lens barrels 34, serves to adjust the focal position of the left or right objective lenses 35, 36. More specifically, f-adjusting washer 37 is so selected, from plural ones with different widths (lengths in the axial direction) that the objective lenses 35, 36 at the right and at the left have a same focal position.

The right objective lens barrel 34 is provided, on the external periphery at the other end, with a male screw 34a.

The right lens barrel body 9 is provided with a female screw 9b formed on the internal periphery at an end, and a fitting portion 21 formed at the other end and adapted to engage with the right eyepiece lens barrel 23. The right lens barrel body 9 is further provided therein with a prism 6, supported by a prism holder 5, of which details will be explained later. The right lens barrel body 9 is also provided with a protruding portion 9a, extending toward the left lens barrel body 25.

The right objective lens barrel 34 and the right lens barrel body 9 explained above are integrally united by the engagement of the male screw 34a of the right objective lens barrel 34 and the female screw 9b of the right lens barrel body 9.

The left objective portion 4b is constructed in the following manner.

The left objective portion 4b is only different in the structure of the left lens barrel body 25, which will therefore be explained in the following.

The left lens barrel body 25 is provided with protruding portions 25a, 25b extending toward the right lens barrel body 9 and adapted to engage with the protruding portion 9a of the left lens barrel body 9.

The focusing mechanism 2 serves to connect the right eyepiece portion 1a and the left eyepiece portion 1b, also to the right objective portion 4a and the left objective portion 4b, and is composed of a central shaft 29, a focusing ring 30 and a shaft member 31.

The central shaft 29 is provided with a stepped portion 29d formed at an end and a male screw 29a formed at the other end.

The focusing ring 30 is composed of an annular portion 30a having a throughbore for accommodating the central shaft 29 and a shaft portion 30b. Between the annular portion 30a and the shaft portion 30b there is formed a recessed portion 27, and a female screw 30d is formed on the internal periphery at the end part of the shaft portion 30b, while a male screw 30c is formed at the base part of the shaft portion 30b.

The shaft member 31 is composed of a shaft member head 31a having a throughbore for accommodating the shaft portion 30b of the focusing ring 30 and a head shaft 31b. A female screw 31c is formed on the internal periphery of the shaft member head 31a, and a female screw 31d is formed on the internal periphery of the head shaft 31b.

In the following there will be explained the assembling of the binoculars, utilizing thus constructed focusing mechanism 2.

At first the central shaft 29 is inserted into the right connecting portion 20 of the right eyepiece portion 1a and the left connecting portion 24 of the left eyepiece portion 1b, and the right eyepiece portion 1a and the left eyepiece portion 1b are mutually tightened by pinching the right and left connecting portions 20, 24 between the stepped portion 29d of the central shaft 29 and a fixing screw 28. The torque of mutual rotation of the right and left eyepiece portions 1a, 1b is adjusted by the level of tightening of the fixing screw 28.

A plastic cover 60 is mounted, with a screw 61, on the fixing screw 28.

Then the shaft member 31 is inserted into the protruding portion 9a of the right objective portion 4a and the protruding portions 25a, 25b of the left objective portion 4b, in a state where the protruding portion 9a is positioned between the protruding portions 25a, 25b. Then a male screw 49a of a fixing screw member 49, having a central throughbore, is fitted with the female screw 31d of the shaft member 31. The torque of mutual rotation of the right and left objective portions 4a, 4b is adjusted by the level of tightening of the fixing screw member 49.

Then a stop member 32 is inserted from the throughbore, at the eyepiece side, of the shaft member 31. The stop member 32 remains in position, as it has a substantially same diameter as the shaft portion 30b of the focusing ring 30 and as the fixing screw 49 is fitted at the objective side of the shaft member 31.

Then the shaft portion 30b of the focusing ring 30 is inserted into the shaft member 31, and the female screw 31c of the shaft member 31 and the male screw 30c of the shaft portion 30b of the focusing ring 30 are mutually fitted, whereby the shaft member head 31a of the shaft member 31 enters the recessed portion 27 of the focusing ring 30.

Then the male screw 29a of the central shaft 29 is fitted with the female screw 30d of the shaft portion 30b of the focusing ring 30, with simultaneous fitting of the right eyepiece portion 1a with the right lens barrel body 9 and of the left eyepiece portion 1b with the left lens barrel member 25. More specifically, the eyepiece side end portion 21 of the right lens barrel body 9 is fitted between the right eyepiece lens barrel 23 and the right connecting portion 20 and between the right eyepiece lens barrel 23 and the fitting portion 22, and the eyepiece side end portion 26 of the left lens barrel body 25 is fitted between the left eyepiece lens barrel 45 and the left connecting portion 24 and between the left eyepiece lens barrel 45 and the fitting portion 44.

Subsequently a screw driver is inserted from the throughbore of the fixing screw 49 to fix the stop member 32 on the objective side end face of the central shaft 29.

After the fixation of the stop member 32, the fixing screw 49 is covered with a rubber cover 33.

The binoculars are thus completed, and the central shaft 29 linearly moves in the axial direction, by the rotation of the focusing ring 30. Also the right eyepiece portion 1a and the right objective portion 4a are rotatable with respect to the left eyepiece portion 1b and the left objective portion 4b, about the central shaft 29.

Along with the above-mentioned axial movement of the central shaft 29, the eyepiece side end portion 21 of the right objective lens barrel 9 slides between the right eyepiece lens barrel 23 and the right connecting portion 20 and between the right eyepiece lens barrel 23 and the fitting portion 22, while the eyepiece side end portion 26 of the left objective lens barrel 25 slides between the left eyepiece lens barrel 45 and the left connecting portion 24 and between the left eyepiece lens barrel 45 and the fitting portion 44, thereby effecting a focusing operation.

In the following there will be given an explanation on the prism holder 5, with reference to FIGS. 2, 3, 4 and 5, which are respectively a plan view of the prism holder 5, a view thereof seen from a direction A, a view thereof seen from a direction B and a bottom view thereof.

The prism holder 5 is composed of a mounting portion 54, a first pillar 52 and a second pillar 53 provided on the mounting portion 54, and a prism support portion 50 extended between the first and second pillars 52, 53.

Figure 5:
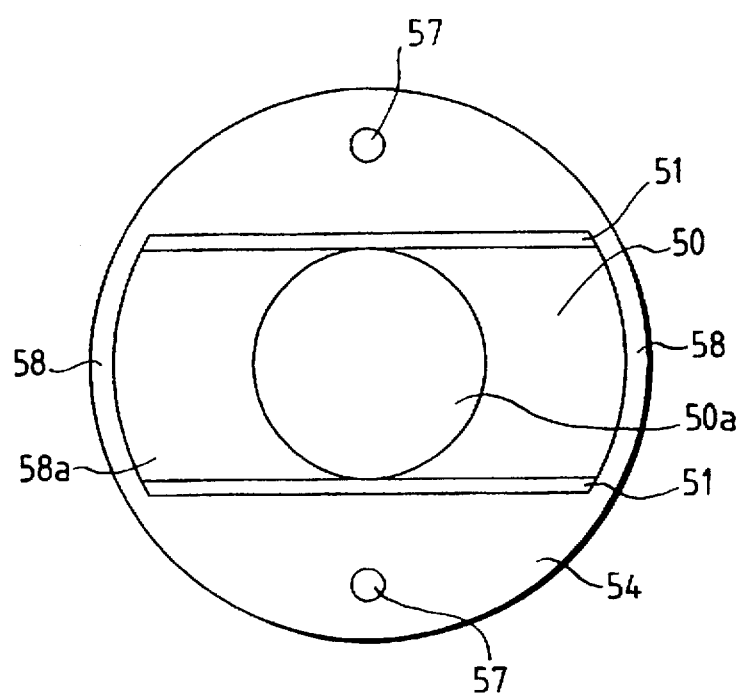
FIG. 5 is a bottom view of the prism holder.

As shown in FIG. 5, the mounting portion 54 is provided with ribs 58, an elongated hole 58a formed between the ribs 58, and mounting holes 57.

Figure 4:
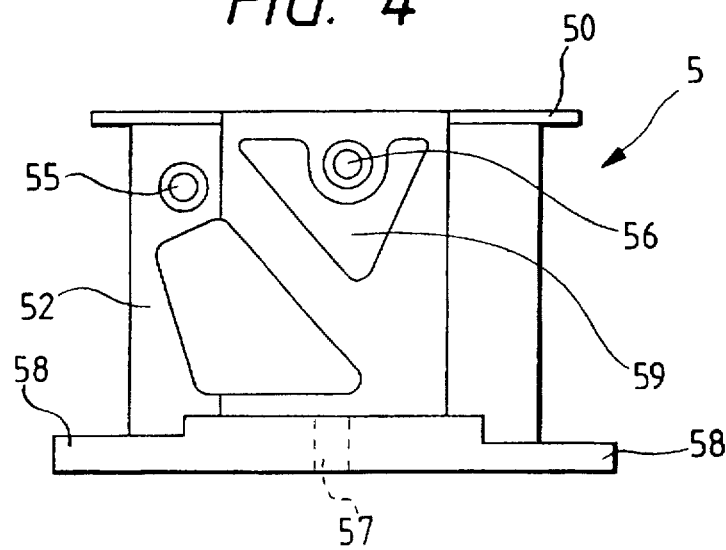
FIG. 4 is a view of the prism holder in FIG. 2, seen from a direction B therein.

As shown in FIG. 4, each of the first and second pillars 52, 53 is provided with a prism side exposing portion 59 and prism position adjusting holes 55, 56.

Figure 2:
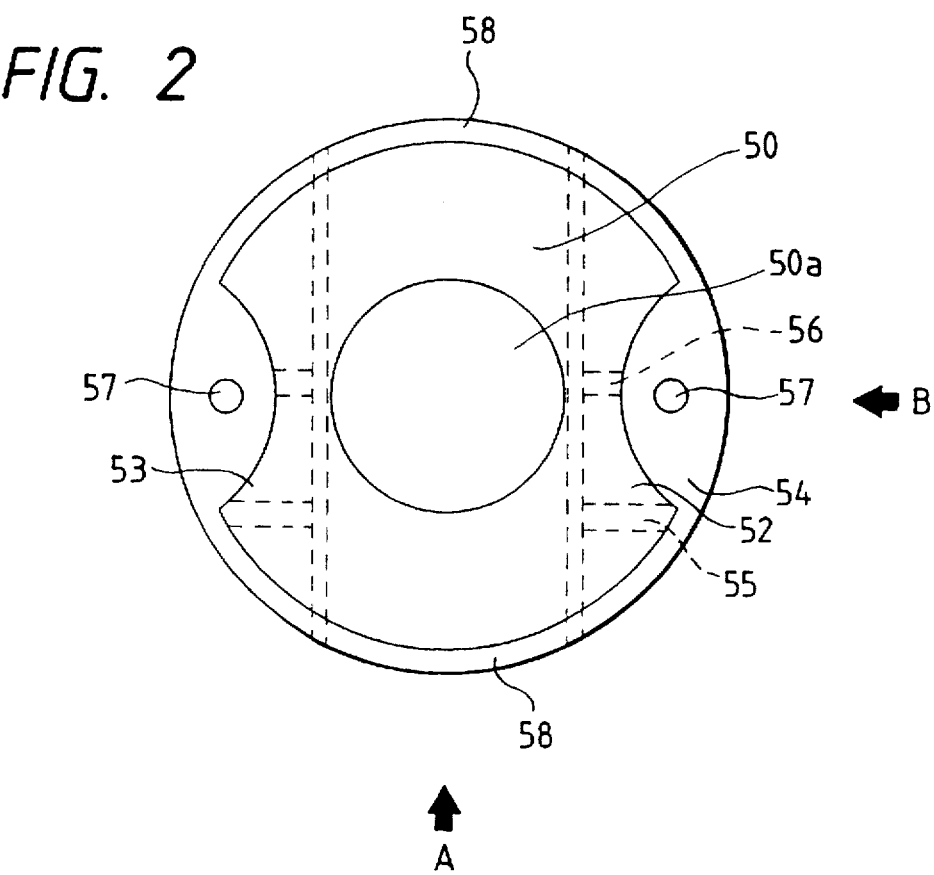
FIG. 2 is a plan view of a prism holder.
Figure 3:
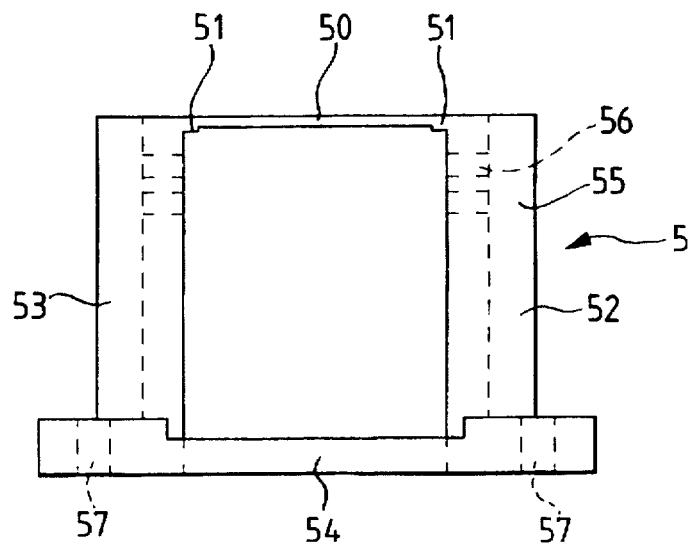
FIG. 3 is a view of the prism holder of FIG. 2, seen from a direction A therein.

The prism support portion 50 is provided, as shown in FIGS. 2 and 3, with an aperture 50a, and a support face 51 positioned on both sides of the aperture 50a and adapted to support the exit face 6b of the roof prism. The prism holder 5 is molded as an integral unit, for example with a plastic material.

The molded formation of the prism box as in the present embodiment dispenses with the subsequent working steps and the washing operation. Also in comparison with the conventional prism box, it can provide sufficient strength with a thinner wall, whereby the weight can be reduced.

Figure 6:
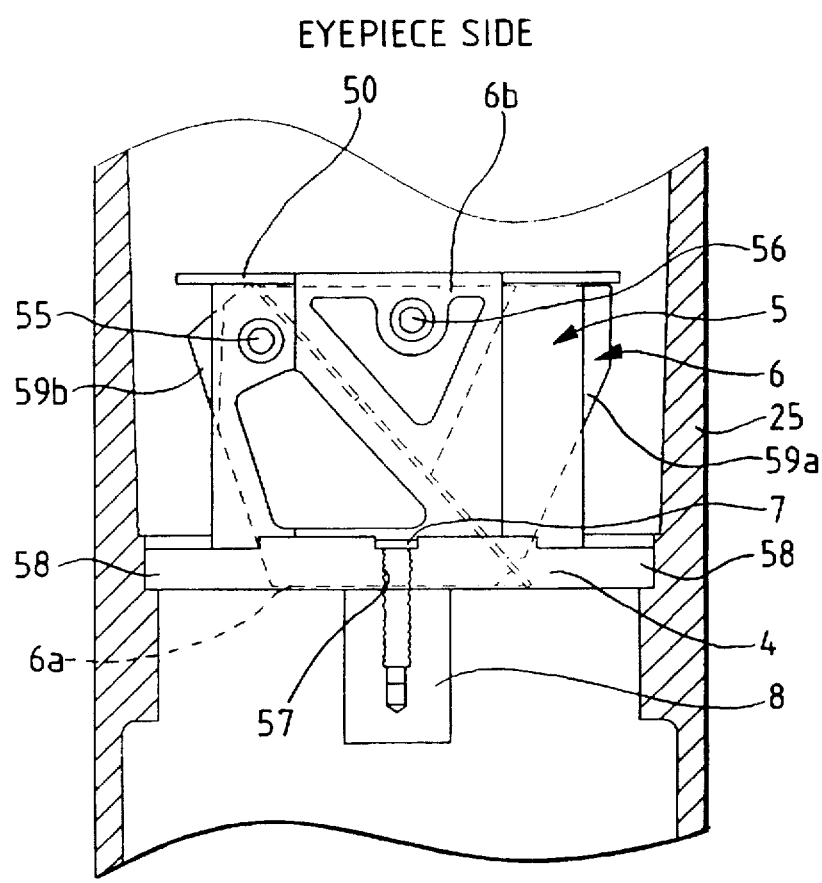
FIG. 6 is a view of the prism box fixed in the objective lens barrel.
Figure 7:
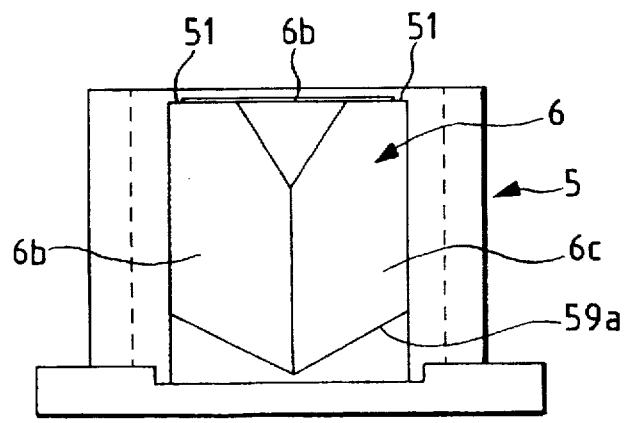
FIG. 7 is a view of the prism box in which a roof prism is mounted.

In the following there will be given an explanation on the prism. As shown in FIGS. 6 and 7, a roof prism is constructed, in the present embodiment, by the combination of a prism 59a having roof faces 6c, 6d and an auxiliary prism 59b, wherein the auxiliary prism 59b has an entrance face 6a and the prism 59a has an exit face 6b.

The roof prism 6 is constructed by at first placing the exit face 6b of the prism 59a on the support faces 51 of the prism support portion 50 and then adhering the auxiliary prism 59b to the prism 59a, wherein the entrance face 6a of the prism is positioned at the side of the elongated hole 58a of the prism holder 5 while the exit face 6b of the prism is positioned at the side of the aperture 50a of the prism holder 5. The roof prism 6 is aligned with the prism holder 5 by mounting unpresented setting screws in the prism position adjusting holes 55, 56 of the first and second pillars 52, 53 and pressing these setting screws against the lateral faces of the prisms.

In a state where the roof prism 6 is supported in the prism holder 5, the external diameter thereof at the exit side is made smaller than the internal diameter of the eyepiece lens barrels 23, 45.

After the alignment, the prism holder 5 is mounted in each of the left and right lens barrel bodies 9, 25.

Figure 8:
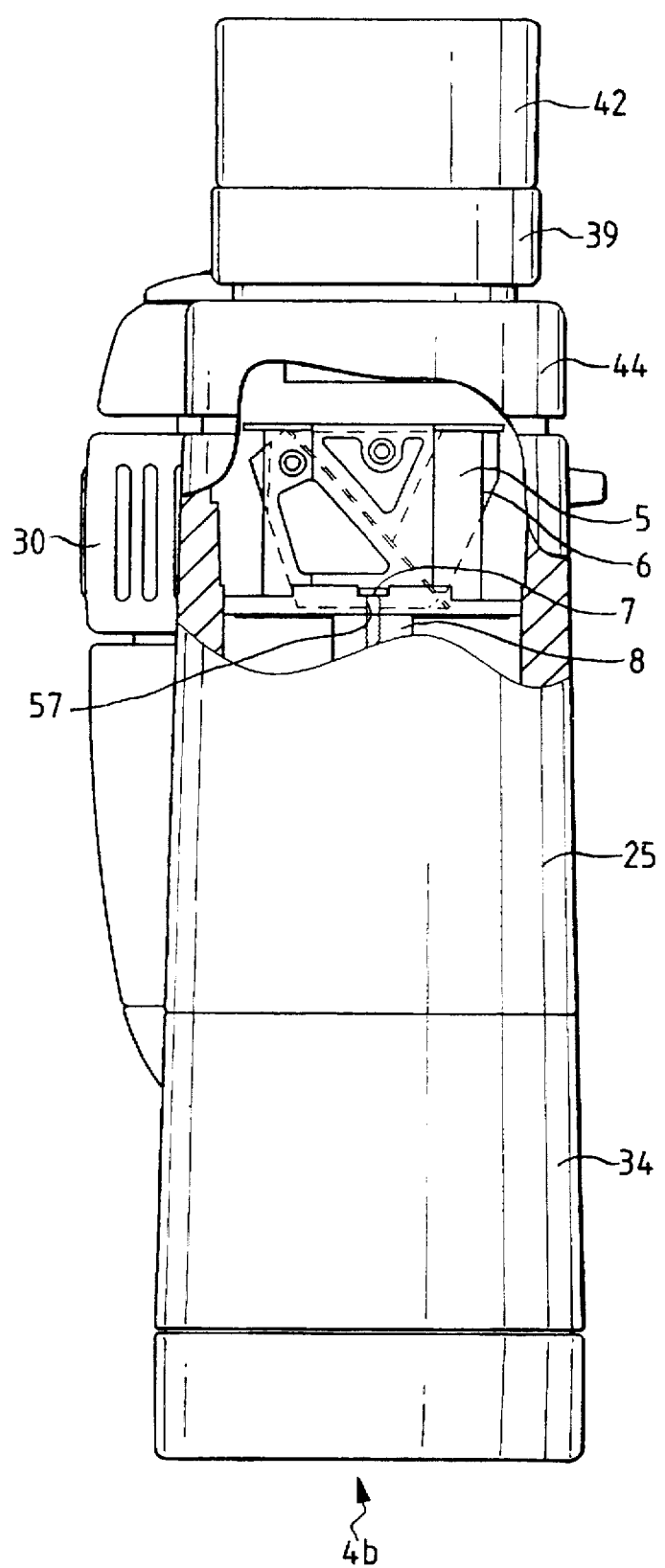
FIG. 8 is a lateral view of binoculars.
Figure 9:
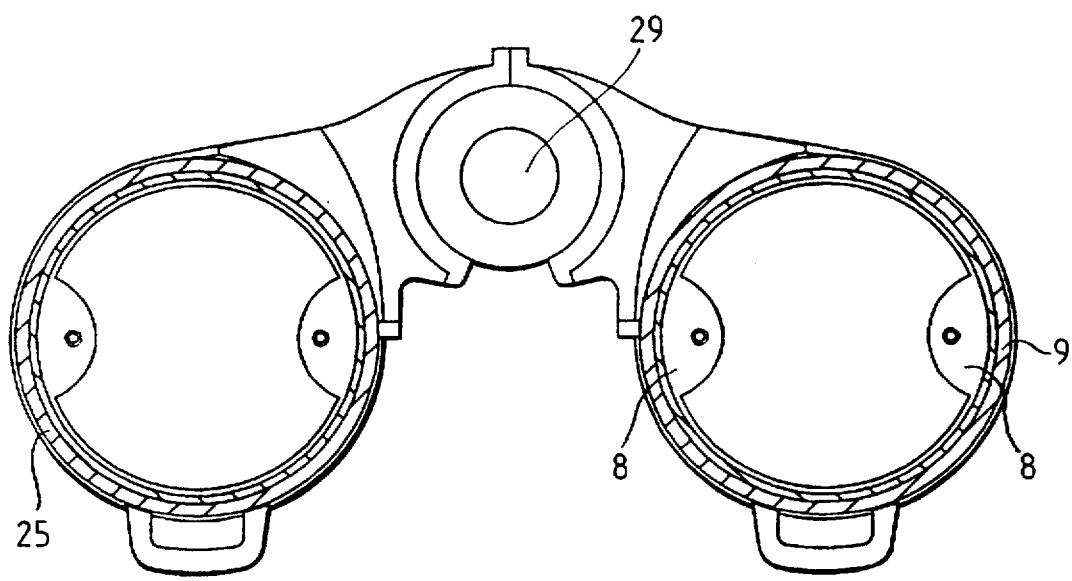
FIG. 9 is a cross-sectional view along a line IX—IX in FIG. 1.

Each of the left and right lens barrel bodies 9, 25 is provided, as shown in FIGS. 1 and 8, with fixing portions 8 having support faces 8a in a direction perpendicular to the optical axis. As shown in FIG. 9, these fixing portions 8 are mutually opposed across the optical axis.

As shown in FIGS. 6 and 8, the prism holder 5 can be fixed to each of the left and right lens barrel bodies 9, 25 by fitting screws 7 in the mounting holes 57 of the prism holder 5 and screwing these screws into the fixing portions 8 of the lens barrel body 9 or 25.

With the mounting of the prism holder 5 in the left or right lens barrel bodies 9, 25, the entrance face 6a of the prism substantially coincides with the support faces 8a of the fixing portions 8. In this state the entrance face 6a of the prism is opposed to the objective lens while the exit face 6b of the prism is opposed to the eyepiece lenses and is positioned at the side of the left or right eyepiece lens barrel 23, 45.

As the entrance face 6a of the roof prism 6 is fixed to the mounting portions 8 in each objective lens barrel as explained above and as the external diameter of the roof prism 6 and the prism holder 5 is made smaller than the internal diameter of the eyepiece lens barrels 23, 45, in the axial movement of the eyepiece unit 1 as a result of the focusing ring 30, the roof prisms 6 and the prism holders 5 enter the interior of the eyepiece lens barrels 23, 45 so that the focusing range can be secured wide, without being affected by the mounting position of the prisms. Also there can be employed small roof prisms as a large entrance faces are not required.

Consequently there can be obtained compact and light binoculars.

Also the molded formation of the prism holder 5 allows reduction in the weight not only of the prism holders 5 but also of the entire binoculars.

According to the present invention, as explained in the foregoing, since the exit face side of the prism is so constructed as to enter the eyepiece lens barrel, the size of the prism can be made smaller and there can be obtained light and compact binoculars.

Also according to the present invention, the prism is inserted, from the exit face side thereof, into the prism holder, so that the entrance face of the prism is positioned at the side of the fixing portions, and the prism in the binoculars can therefore be made smaller.

Further according to the present invention, the prism box can be made lighter in weight as it is molded with a plastic material.

What is claimed is:

1. Binoculars comprising:

first and second objective lens barrels respectively having objective lenses at one end thereof;

first and second intermediate lens barrels fixed to a second end of said first and second objective lens barrels;

first and second eyepiece lens barrels respectively having eyepiece lenses and adapted to be slidably fitted in the other ends of said first and second intermediate lens barrels;

prisms provided in respective prism holders between said objective lenses and said eyepiece lenses and said holders are positioned respectively in said first and second intermediate lens barrels; and a focusing mechanism provided with a focusing member and adapted to displace said first and second eyepiece lens barrels in the direction of an optical axis by rotation of said focusing mechanism;

wherein each of said prisms is composed of a roof prism having an entrance face for receiving the light beam from said objective lens and an exit face for directing said received light beam to said eyepiece lens; and in said prism holder, said exit face is formed as to be insertable into said eyepiece lens barrel and the periphery of said entrance face is fixed to said objective lens barrel so that said exit face enters said eyepiece lens barrel when said eyepiece lens barrel is axially displaced toward said holder by means of said focusing mechanism.

2. Binoculars according to claim 1, further comprising prism boxes for supporting said roof prisms;

wherein each of said prism boxes includes a prism support portion having a support face for supporting a rim portion of said exit face and an inserting aperture for inserting said roof prism from the exit face thereof, and is composed of a fixing portion to be fixed in said objective lens barrel and a position adjusting portion provided between said prism supporting portion and said fixing portion and adapted to effect alignment between said support face and said exit face.

3. Binoculars according to claim 2, wherein said prism box is integrally molded with a plastic material.

4. Binoculars comprising:

a pair of objective lens barrels;

a pair of eyepiece lens barrels;

a focusing mechanism to displace, and to focus, said pair of eyepiece lens barrels in a direction of an optical axis relative to said pair of objective lens barrels;

a pair of objective lenses, each provided at one end portion of said pair of objective lens barrels;

a pair of intermediate lens barrels provided between said pair of objective lens barrels and said eyepiece lens barrels;

a pair of annular eyepiece side end portions provided at one end of said pair of intermediate lens barrels opposite said objective lens barrels;

a pair of roof prisms, each fixed in a holder, each said holder being fixed in said pair of intermediate lens barrels; and a pair of eyepiece lenses provided in said pair of eyepiece lens barrels;
  wherein said pair of eyepiece lens barrels have an internal diameter larger than the external diameter of said roof prisms, and an external diameter smaller than the internal diameter of said eyepiece side end portions of said pair of intermediate lens barrels;
  said pair of eyepiece lens barrels having annular fitting portions surrounding said eyepiece lens barrels;
  said eyepiece side end portions of said intermediate lens barrels being inserted between said eyepiece lens barrels and said annular fitting portions;
  each of said holders includes an entrance face opposed to said objective lens and adapted to receive a light beam from said objective lens, and an exit face opposed to said eyepiece lens and adapted to direct the light beam from said objective lens to said eyepiece lens;
  whereby each of said exit faces of said holder is adapted to enter each of said eyepiece lens barrels when said eyepiece lens barrels are displaced toward said objective lens barrels by said focusing mechanism.

5. Binoculars comprising:
  a pair of objective lens barrels including objective lenses;
  a pair of eyepiece lens barrels including eyepiece lenses;
  a pair of intermediate lens barrels disposed between said pair of objective lens barrels and said pair of eyepiece lens barrels;
  a pair of roof prisms, each fixed in a holder, each said holder being fixed in one of said pair of intermediate lens barrels;
  a focusing member to displace the eyepiece lens barrels with respect to the objective lens barrels;
  each of said holders including an entrance face opposed to said objective lens and adapted to receive a light beam from said objective lens, and an exit face opposed to said eyepiece lens and adapted to direct the light beam from said objective lens to said eyepiece lens;
  each of said exit faces of said holders being adapted to enter each of said eyepiece lens barrels when said eyepiece lens barrels are displaced toward said objective lens barrels by said focusing mechanism.

* * * * *